INVENTORS:
DAVID G. BRAITHWAITE
LAWRENCE L. BOTT
PETER L. GROSS
JAMES E. LAUBACH
WARREN L. ALTMAN
WILLIAM HANZEL

BY
ATT'YS

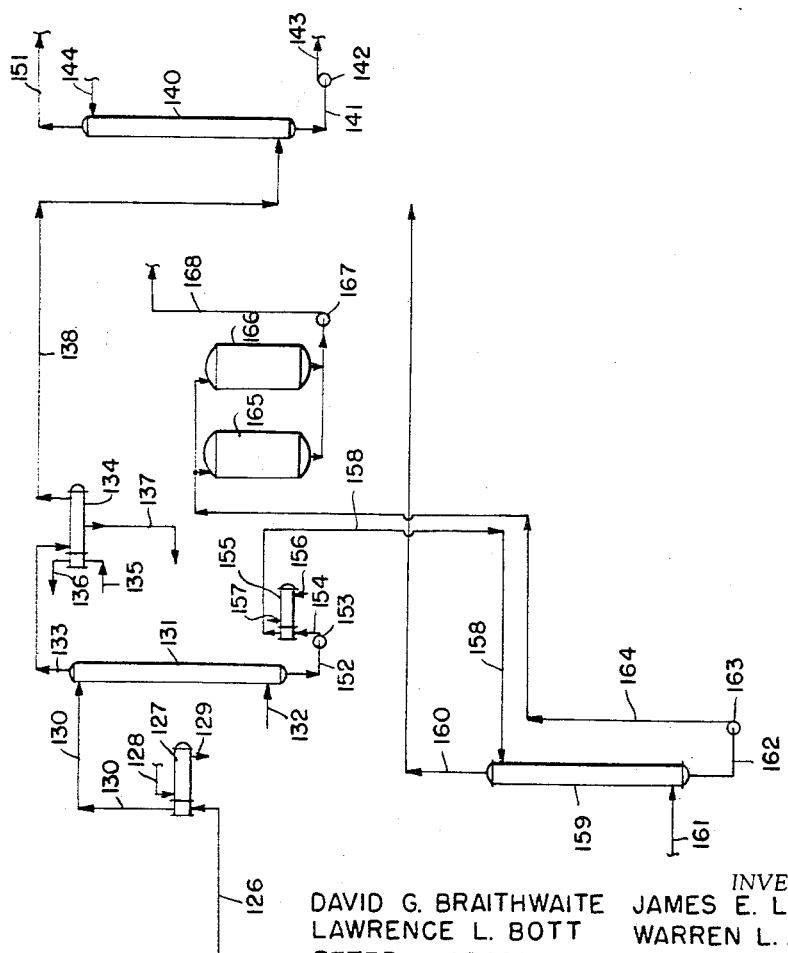

United States Patent Office 3,408,273
Patented Oct. 29, 1968

3,408,273
ORGANIC LEAD RECOVERY FROM ELECTROLYTES BY STEAM AND AZEOTROPIC DISTILLATION
David G. Braithwaite, Chicago, Lawrence L. Bott, Oak Park, and Peter L. Gross, Riverside, Ill., and James E. Laubach, Warren L. Altman, and William Hanzel, Lake Jackson, Tex., assignors to Nalco Chemical Company, Chicago, Ill., a corporation of Delaware
Filed Mar. 11, 1964, Ser. No. 351,021
2 Claims. (Cl. 204—59)

ABSTRACT OF THE DISCLOSURE

An organic lead compound is recovered from electrolytes containing a water miscible organic solvent, and optionally a water immiscible organic solvent, together with a high boiling organic solvent by steam distilling the mixture under conditions in which at least the water miscible organic solvent and the organic lead compound are steam distilled and the high boiling organic solvent remains as a residue, the distillate separates into an aqueous phase and a water immiscible phase, the aqueous phase is washed with a washing liquid to remove the water miscible organic solvent which is recovered from said washing liquid, the organic lead compound is recovered from the water immiscible phase and the high boiling organic solvent is recovered from said residue.

---

Figure 1:
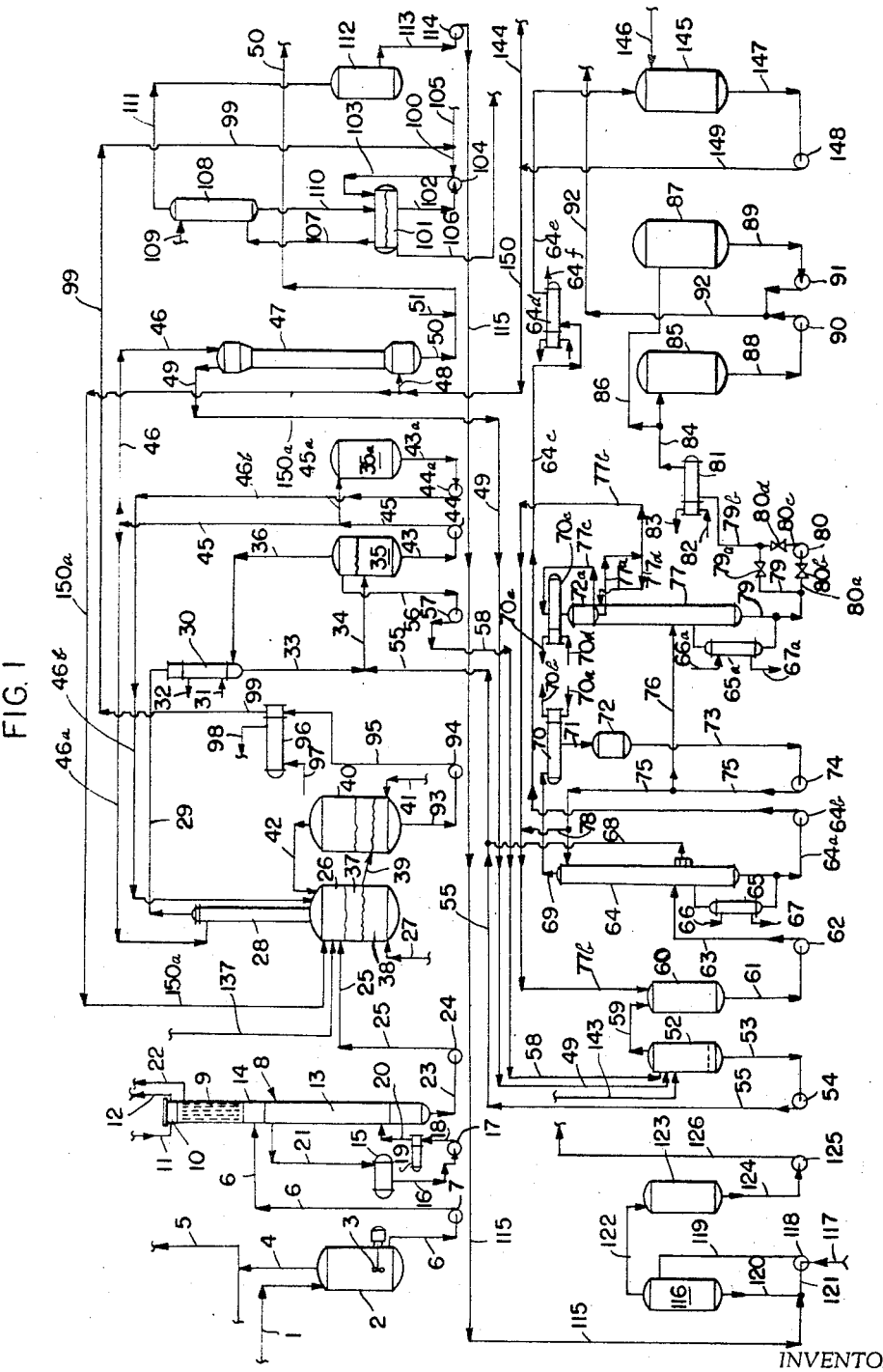

This invention relates to a process for recovering organic lead compounds from electrolytes, and more particularly to a process for recovering tetramethyl lead or tetraethyl lead or other tetraalkyl lead compounds, or mixtures thereof, from electrolytes obtained by electrolyzing an anhydrous solution of a Grignard reagent in an organic solvent for the Grignard reagent, using a sacrificial lead anode.

The manufacture of organo metallic compounds, and more specifically organo lead compounds, by electrolyzing an anhydrous solution of a Grignard reagent in an organic solvent for the Grignard reagent is disclosed in U.S. Patents 3,007,857 and 3,007,858. In the process disclosed in U.S. 3,007,858 an extraneous organic halide is added to the electrolyte. The term "Grignard reagent" refers to a complex organo magnesium compound which is commonly prepared by reacting magnesium with an organic halide. The term "organic halide" refers to organic chlorides, bromides and iodides. The halogen portion of the added organic halide does not have to be the same as the halogen portion of the Grignard reagent but in practice they are usually the same and the organic chlorides are most commonly employed because of their ready availability.

When lead is used as a sacrificial anode in an organic solvent solution of a Grignard reagent, organo lead compounds are formed. The cathode can be composed of any suitable conducting but non-reacting material, including, for example, ordinary steel, stainless steel, platinum, graphite, or the like. Ordinarily, the anode is composed of lead and the cathode of steel.

Various organic solvents for the Grignard reagent can be employed. Since conductivity of the solvent solution of the Grignard reagent is a factor in the efficient operation of the process, it is desirable to employ solvents which enhance the current efficiency. Water miscible solvents, which boil below the boiling point of the organic lead compound, such as tetrahydrofuran (boiling point 64–66° C.) can be employed. Water immiscible solvents, which boil above the boiling point of the organic lead compound, for example, the dibutylether of diethylene glycol or the hexylethylether of diethylene glycol, with or without water immiscible aromatic hydrocarbons, which boil about the same as or below the organic lead compound, e.g., toluene and/or benzene, can be used. Water miscible solvents which boil above the boiling point of the organic lead compound, e.g., the diethyl ether of diethylene glycol, diethyl ether or triethylene glycol, and/or the diethyl ether of tetraethylene glycol, can be used. Good results are obtained by employing a combination of solvents boiling below and above the boiling point of the organic lead compound, and preferably also in addition a solvent having approximately the same boiling point as the organic lead compound. Thus, water miscible solvents and water immiscible solvents, particularly a water miscible solvent boiling below the boiling point of the organic lead compound and a water immiscible solvent boiling above the boiling point of the organic lead compound can be used, preferably with the addition of a water immiscible solvent having about the same boiling point as the organic lead compound. Also, a solvent boiling below the boiling point of the organic lead compound can be combined with a water miscible solvent boiling above the boiling point of the organic lead compound. The organic lead compounds produced in the process are water immiscible.

The end use of the organic lead compounds as antiknock agents in gasoline does not ordinarily permit the retention with the organic lead compounds of the solvents normally employed in producing them. Hence, it is necessary to separate these solvents in such a way that they can be re-used in subsequent processing operations. This separation is not easy because the organic lead compounds are sensitive to heat and concentration, or, in other words, tend to become unstable under some conditions that might ordinarily be encountered in recovery procedures. The separation is rendered more difficult where both water miscible and water immiscible solvents are present. These solvents not only have to be separated from the organic lead compound but also, for practical reasons, have to be restored to a condition where they can be re-used in the electrolysis. Furthermore, the Grignard reagent used in the electrolysis is sensitive to water, hence if water is used in the recovery procedures it must be removed later.

One of the objects of the present invention is to provide a new and improved process for recovering an organic lead compound and an organic solvent from residual electrolyte derived by electrolyzing an anhydrous organic solvent solution of a Grignard reagent, using a sacrificial lead anode.

A further object is to provide a new and improved process for recovering an organic lead compound and organic solvents from electrolytes of the type described in which the organic solvent consists essentially of a mixture of solvents boiling above and below the boiling point of the organic lead compound, with or without the addition of a solvent having substantially the same boiling point as the organic lead compound.

Another object is to provide a new and improved process for recovering organic lead compounds and organic solvents from electrolytes of the type described in which the organic solvent consists essentially of a mixture of a steam distillable water miscible organic solvent and an organic solvent which is not steam distillable.

A more specific object of the invention is to provide a new and improved process for recovering tetramethyl lead and organic solvents from residual electrolytes derived by electrolyzing an anhydrous organic solvent solution of a methyl Grignard reagent, using a sacrificial lead anode.

Other objects of the invention will appear from the following description in conjunction with the accompanying drawing in which:

FIGURE 1 illustrates diagrammatically an organic lead recovery system representing a preferred embodiment of the invention; and FIGURE 2 is a continuation of the diagrammatic showing in FIGURE 1.

In accordance with the invention a new and improved organic lead recovery system is provided in the manufacture of organic lead compounds by a process wherein an electrolyte comprising an anhydrous solution of a Grignard reagent in a mixture of steam distillable water miscible organic solvent and a nonsteam distillable organic solvent is electrolyzed, using a sacrificial lead anode, and a water immiscible steam distillable organic lead compound is recovered from the residual electrolyte. Since the process of preparing organic lead compounds in this manner preferably involves the addition of an extraneous (i.e., an excess over that required to form the Grignard reagent) organic halide to the electrolyte, the steps of the recovery system will be described on the basis that residual organic halide is present in the electrolyte after electrolysis.

The process, therefore, involves the following steps:

(a) First separating organic halides from said residual eletcrolyte, (b) Thereafter steam distilling the residual product to produce a distillate containing said water immiscible organic lead compound and other steam distillable components including said steam distillable organic solvent or solvents while leaving as a residue non-steam distillable components including said organic solvent or solvents and a brine containing water soluble inorganic salts, (c) Water washing said distillate to remove said steam distillable water miscible organic solvent, (d) Simultaneously recovering the water immiscible phase of said distillate consisting essentially of an organic lead compound, (e) Recovering said steam distillable water miscible organic solvent from the wash water from (c), and (f) Recovering said non-steam distillable organic solvent or solvents from the brine in said residue.

In carrying out the process it is preferable for practical and economical reasons to re-utilize the water miscible organic solvent from (e) in the manufacture of additional quantities of organic lead compounds by the same procedure. For the same reason, it is preferable to re-utilize the non-steam distillable solvent or solvents from (f) in making additional quantities of organic lead compounds by the same procedure. Thus, these solvents are used over and over again. It will be understood, however, that recovery of the solvents for re-utilization in the process necessarily entails removal of water which would otherwise react with the Grignard reagent.

In practicing the process it is desirable, especially in the manufacture of tetramethyl lead, to add to the residual electrolyte (containing a steam distillable water miscible organic solvent, a non-steam distillable organic solvent and a water immiscible steam distillable organic lead compound), a steam distillable water immiscible aromatic hydrocarbon, such as, for example, toluene, at a point in the process before said residual electrolyte is subjected to steam distillation. In other words, such aromatic hydrocarbon can be added to the electrolyte before, during or after the electrolysis but in any event is preferably present when the residual electrolyte containing the organic lead compound is steam distilled.

In carrying out the solvent recovery process, it is desirable that the steam distillable components of the mixture, with which said organic lead compound is steam distilled, are always in excess of about 20% by weight of said organic lead compound.

In the manufacture of a tetraalkyl lead compound, such as, for example, tetramethyl lead, by a process of the type described, a preferred procedure is to employ an electrolyte comprising an anhydrous solution of a Grignard reagent, such as, for example, methyl magnesium chloride, in a mixture of a steam distillable water miscible organic solvent, such as, for example, tetrahydrofuran, a steam distillable water immiscible organic solvent, such as, for example, toluene, and a non-steam distillable organic solvent, such as, for example, a hexylethylether of diethylene glycol which is water immiscible, or the diethyl ether of tetraethylene glycol, which is water miscible.

In the recovery process the steam distillable components are, for example, tetrahydrofuran and toluene. The tetramethyl lead is also steam distilled. The residue consists essentially of the non-steam distillable organic solvent, for example, the hexylethylether of diethylene glycol in a brine containing magnesium salts, such as magnesium chloride. It is desirable to remove any extraneous organic halides, such as, methyl chloride, before the residual electrolyte is brought into contact with steam, thereby avoiding the necessity of removing water from the organic halide and making it possible to re-utilize the organic halide in subsequent operations.

Normally, the electrolysis is carried substantially to exhaustion of the Grignard reagent in the electrolyte but any small quantity of Grignard reagent present in the residual electrolyte is removed by reaction with the water when steam is introduced into the mixture, or by subsequent hydrolysis with acid.

In the manufacture of tetramethyl lead it is especially desirable to carry out the process with a mixture of 25–50% by weight tetrahydrofuran and 75–50% by weight of the hexylethylether of diethylene glycol, based on the total weight of tetrahydrofuran and hexylethylether of diethylene glycol and also to add a proportion of toluene within the range of about 15–25% by weight of the tetramethyl lead.

In order to carry out the recovery process, the apparatus used comprises in combination the following:

(a) Means for removing organic halide from said residual electrolyte, (b) Steam distillation apparatus provided with means for steam distilling a steam distillable product and separating a distillate and a residue therefrom, (c) Means for transferring the residual product from (a) to (b), (d) A distillate recovery vessel, (e) Means for transferring the distillate from (b) to (d), (f) A water wash column, (g) Means for transferring liquid containing said organic lead compound and minor proportions of steam distillable solvent from (d) to (f), (h) Means for recovering said organic lead compound from (f), (i) Purification means for steam distillable water miscible solvent, (j) Means for transferring water miscible solvent containing some water, organic lead compounds and any steam distillable water immiscible solvents from (d) to (i), (k) Purification means for non-steam distillable solvent, and (l) Means for transferring the residue from (b) to (k).

The purified water miscible solvent from (i) and the purified solvent from (k) are re-utilized as solvents for additional quantities of Grignard reagent made by reacting magnesium with an organic halide. In this manner the solvents recovered from a previous run are employed in successive runs.

The following description illustrates a preferred method and apparatus for carrying out the recovery process in the manufacture of a particular organic lead compound, namely, tetramethyl lead.

Referring to FIGURE 1 of the drawings, cell liquor containing tetramethyl lead, toluene, tetrahydrofuran, hexylethylether of diethylene glycol, methyl chloride and some dissolved gaseous hydrocarbons, is introduced into the recovery system through pipe or line 1 to a holder or surge tank 2 equipped with a motor driven agitator 3. A portion of the methyl chloride escapes through an outlet from the top of the vessel to line 4 and is returned through line 5 to storage for re-use in making Grignard agent for the cell system, not shown.

The cell liquor is pumped from vessel 2 through line 6 by means of pump 7 to a stripping tower 8 provided with a series of vertically arranged plates or baffles or tubes 9 in the upper portion thereof. The upper end of the stripping tower 8 is also provided with a cooling jacket 10 having a cold water inlet 11 and an outlet 12. The lower part of the tower 13 is provided with baffles or rings, not shown, which are adapted to facilitate the liberation of any gases present in the cell liquor introduced into the upper central portion of the tower 14 through line 6.

The lower part 13 of the tower 8 is heated by hot water from tank 15 which circulates from the bottom of said tank through line 16, pump 17, line 18, heat exchanger 19, line 20 to a suitable jacket or coil disposed in or around the lower part 13 of the tower 8. The circulating hot water returns to tank 15 through line 21. The temperature of the water is subject to variation depending upon the particular organic lead compound being recovered and the solvents present, but with a cell liquor of the type described this temperature is usually around 215 to 225° at atmospheric pressure, or slightly above. An inert gas such as natural gas can be added to the cell liquor, for example, by metering it continuously into the cell liquor in the lower part of tower 8, to facilitate stripping the organic halide. The organic halide, in this case methyl chloride, escapes from the top of the tower through line 22 and may contain very small amounts of tetrahydrofuran and tetramethyl lead. However, since it is anhydrous it can be used directly in subsequent cell operations.

The cell liquor from which organic halide has now been removed is withdrawn from the bottom of tower 8 through line 23 and is pumped by pump 24 through line 25 to steam distillation vessel 26. Steam is introduced into vessel 26 through line 27 and the steam distillable components pass upwardly through tower 28, line 29 and heat exchanger 30 where they are cooled and condensed by cooling water introduced by line 31 and withdrawn by line 32. The distillate passes through line 33 and line 34 to distillate receiver 35. A line 36 connects the top of distillate receiver 35 with the bottom of heat exchanger 30 to provide pressure equilibrium.

Under the conditions described, tetrahydrofuran, tetramethyl lead and toluene are distilled through tower 28, condensed by heat exchanger 30 and received in distillate receiver 35. The residue consists essentially of an upper layer 37 composed of the hexyl ethylether of diethylene glycol and a lower brine layer 38 containing mainly water and dissolved magnesium chloride. A line 39 connects vessel 26 with another steam distillation vessel 40 and the residual liquid in vessel 26 is passed to the vessel 40 where it is subjected to further steam distillation by steam introduced through line 41. The steam distillable components, including tetrahydrofuran, tetramethyl lead and toluene, pass upwardly through line 42 and thence back to the top of vessel 26 where they escape through tower 28 and pass to receiver 35 in the manner previously explained.

Receiver 35 now contains two liquid layers, the lower one consisting essentially of tetrahydrofuran, tetramethyl lead, toluene and small amounts of water, and the upper layer consisting essentially of tetrahydrofuran and water. The lower layer is withdrawn through line 43 and pumped by pump 44 through line 45 and line 46 to a water wash column vessel 47 which consists of a tower packed with Raschig rings, polypropylene Pall rings, or the like.

A portion of the lower layer from receiver 35 can, if desired, be recirculated through line 46a controlled by suitable valves, not shown, to tower 28 where it serves as a reflux. An auxiliary receiver 35a is also provided and the liquid from line 45 controlled by a suitable valve, not shown, can be recycled to vessel 26 through line 43a, pump 44a and line 46b. Throughout the apparatus suitable valves, not shown, are provided in accordance with good engineering practice.

Water at a temperature of about 50° F. to 120° F. is introduced through line 48 into the bottom of tower 47 and circulated countercurrently upwardly through the distillate entering the top of said vessel from line 46. The circulating water is withdrawn through line 49 and at this point contains practically all of the water miscible solvent, i.e., tetrahydrofuran. The tetramethyl lead, together with steam distillable water immiscible solvent, that is, toluene, is withdrawn from the bottom of vessel 47 through line 50 and transferred to product storage. Auxiliary components of anti-knock mixtures, such as ethylene dichloride and ethylene dibromide are introduced into the product through line 51 before it is sent to storage.

The aqueous solution of tetrahydrofuran passes through line 49 to a purification system where water and other impurities are removed. The first purification vessel 52 is a knock-out pot where any minor proportions of tetramethyl lead and toluene drop to the bottom and are removed through line 53. The tetramethyl lead and toluene removed in this manner is pumped by pump 54 through line 55 to line 34 and introduced into distillate receiver 35.

Additional quantities of tetrahydrofuran and water with minor amounts of impurities pass through the top of vessel 35 through line 56, pump 57 and line 58 to the top of vessel 52. The aqueous solution of tetrahydrofuran in water (containing about 20–30% by weight tetrahydrofuran) passes from vessel 52 through line 59 to a surge drum or vessel 60, then through line 61, pump 62 and line 63 to a packed low pressure 3–7 p.s.i.g. 165°–220° F. azeotropic column 64. Steam is introduced into heat exchanger 65 through line 66 and removed through outlet 67. The column is heated by recirculating the liquid therein through heat exchanger 65. Any small amounts of tetramethyl lead and toluene which separate in this column are withdrawn through line 68 which connects with line 55 and thence to the distillate receiver 35. The azeotropic distillate containing about 94% tetrahydrofuran and about 5% water with less than 1% toluene passes from the top of tower 64 through line 69 to heat exchanger 70, from which it returns through line 71, vessel 72, line 73, pump 74, and line 75. Heat exchanger 70 is cooled by a cooling water jacket having an inlet 70a and an outlet 70b. A part of the tetrahydrofuran-water solution passes through line 76 to a high pressure (e.g., 50–100 p.s.i.g., temperature 200–230° F.) azeotropic column 77 and the remainder passes through line 75 and serves as a reflux solution in column 64. Means for heating column 77 are generally shown at 65a, 66a and 67a and are similar to the heating means 65, 66 and 67 previously described.

The bottom layer of water containing some toluene from tower 64 is pumped from line 64a by pump 64b through line 64c to a heated receiver 64d where the two components are allowed to settle and the water is passed to vessel 145 through line 64e. The toluene is drawn off through line 64f.

The reflux from tower 77 is passed through line 77c to heat exchanger 70c which is cooled by cooling water flowing through lines 70d and 70e. The condensate is passed to receiver 72a. A mixture of tetrahydrofuran (about 89%) and water is withdrawn through line 77a from receiver 72a mounted at the top of column 77 and recycled to surge tank 60 through line 77b. Another portion is recycled to tower 77 through line 77d. A line 78 connects line 75 to line 77b. Suitable valves, not shown, are provided to control liquid flow.

Dry tetrahydrofuran containing small amounts of toluene passes through line 79, valve 79a, and line 79b and to heat exchanger 81 having a cold water jacket into which cold water is introduced through line 82 and withdrawn through line 83. A by-pass arrangement comprising pump 80, line 80a controlled by valve 80b and line 80c controlled by valve 80d is provided to remove the bottom layer from tower 77 when the latter is shut down. Otherwise valves 80b and 80d are normally closed and pump 80 does not operate. From heat exchanger 81 the tetrahydrofuran passes through line 84 to storage vessel 85 or alternatively through line 86 to storage 87. The anhydrous tetrahydrofuran can be withdrawn from storage vessels 85 and 87 by pumping it through lines 88 and 89 with pumps 90 and 91, respectively, thence into line 92 which leads to the reaction vessels where additional quantities of Grignard reagent are prepared.

The non-steam distillable water immiscible organic solvent and brine from vessel 40 are withdrawn through line 93 by pump 94, and pumped through line 95 to a heat exchanger 96 which is provided with a cooling jacket into which cold water is introduced through line 97 and withdrawn through line 98. From heat exchanger 96 the brine-water immiscible solvent mixture passes through line 99 and line 100 to hydrolyzation vessel 101. The portion of the liquid in this vessel is continuously circulated through lines 102 and line 103 by pump 104. A dilute aqueous solution of hydrochloric acid sufficient to produce a pH of 3 to 4 is introduced into the circulating liquid through line 105. The acidic condition minimizes MgOHCl floc and accelerates the layering of the water immiscible organic solvent and brine. The liquid in vessel 101, therefore, consists essentially of the water immiscible organic solvent, i.e., hexylethylether of diethylene glycol and acidified brine. The acidified brine is preferably scrubbed with toluene in a suitable apparatus, not shown, to extract any traces of hexylethylether of diethylene glycol and the residual brine is withdrawn to waste through line 106. The scrubbing liquid containing toluene and hexylethylether of diethylene glycol is used in subsequent electrolysis runs.

The water immiscible organic solvent is withdrawn from vessel 101 through line 107 and washed with water in tower 108, the water being introduced through line 109. The wash water containing hydrochloric acid and magnesium chloride passes from the bottom of tank 108 through line 110 to vessel 101. The washed water immiscible organic solvent passes through line 111 to a holding or surge tank 112 from which it is pumped through line 113 by pump 114, then through line 115 to vessel 116. Optionally, dilute caustic soda solution is introduced through line 117 and pumped by pump 118 through line 119 into vessel 116 to neutralize the acidity of the water immiscible organic solvent. Recirculation is effected through line 120, line 121, pump 118 and line 119. The water immiscible organic solvent passes through line 122 to a gas dryer surge tank 123. Then it passes through line 124 and is pumped by pump 125 through line 126 to a drying system shown in FIGURE 2.

Referring to FIGURE 2, the water immiscible solvent in line 126 which still contains small amounts of water passes through a heat exchanger 127 which is heated by a steam jacket, the steam being introduced through line 128 and withdrawn through line 129. The hot water immiscible solvent at a temperature of 200° F. passes through line 130 to a packed gas dryer column 131. Natural gas or other suitable drying medium is introduced into the base of the column through line 132. The drying gas containing water with possible traces of water immiscible organic solvent (hexylethylether of diethylene glycol), tetrahydrofuran, toluene and tetramethyl lead, passes through line 133 to condenser 134 cooled with cold water introduced through line 135 and withdrawn through line 136. The water immiscible organic solvent passes through line 137 and is returned to vessel 26 (FIGURE 1). The gaseous products pass through line 138 to column 140 where small amounts of water, tetrahydrofuran and tetramethyl lead are removed through line 141 and pumped by pump 142 through line 143 to vessel 52.

Water is introduced into column 140 through line 144, the water being supplied from a water storage tank 145 into which it is introduced through line 146. Water from this tank is pumped from line 147 by pump 148 through line 149. The same water supply is used for the wash water which passes through line 150 into line 48 and thence to the bottom of water wash column 47. In a typical operation the wash water volume in column 47 is about 2 to 5 times, preferably 3 times, the volume of the feed through line 46.

Water from tower 64 is returned to tank 145 through line 64a, pump 64b, line 64c, heat exchanger 64d and line 64e. Heat exchanger 64d is provided with a cooling water jacket. Tank 145 also supplies water, if desired, for steam distillation vessel 26 through lines 149, 150 and 150a. Suitable valves, not shown, are provided to control the flow. In a typical operation, about 10% to 25%, preferably 12–15% water, based on the volume of the effluent, is added through line 150a.

The residual drying gas from column 140 consisting principally of natural gas and impurities passes through line 151 and is consumed by burning.

The dry hexylethylether of diethylene glycol (water immiscible organic solvent) passes through line 152 and is pumped by pump 153 through line 154, heat exchanger 155, cooled by cold water introduced into line 156 and withdrawn through line 157. From heat exchanger 155 the dry water immiscible organic solvent passes through line 158 to tower 159 where hydrocarbon gases, such as methane, ethane and small amounts of methyl chloride are released through line 160 and pass to a suitable flare for burning.

Methyl chloride from lines 5 and 22 is introduced through line 161. The water immiscible solvent containing small amounts of methyl chloride is passed through line 162 and pumped by pump 163 through line 164 to storage vessels 165 and 166 from which it is withdrawn by means of pump 167 and re-utilized by pumping it through line 168 to suitable vessels where the electrolyte is prepared.

The recovery system previously described is applicable to the recovery of other steam distillable organic lead compounds including tetraethyl lead or mixed ethyl and methyl tetraalkyl leads using the same or different solvents.

The diether glycol solvent is preferably a liquid diether of an alkylene glycol, most desirably a liquid diether of polyalkylene glycol. Examples of preferred diethers are those in which at least one of the terminal ether groups contain at least six carbon atoms.

The preferred diethers have at least one terminal alkyl ether group in which the alkyl radical contains at least six carbon atoms and preferably contains a total of two to five oxygen atoms, a total of at least eight carbon atoms in the terminal alkyl groups and a total of two to six carbon atoms in the alkylene groups. Typical examples of preferred organic ethers for the purpose of the present invention are those having the formulae:

(1) $\quad R\text{—}O\text{—}R_1\text{—}O\text{—}R_5$ (2) $\quad R\text{—}O\text{—}R_1\text{—}O\text{—}R_2\text{—}O\text{—}R_5$ (3) $\quad R\text{—}O\text{—}R_1\text{—}O\text{—}R_2\text{—}O\text{—}R_3\text{—}O\text{—}R_5$ (4) $R\text{—}O\text{—}R_1\text{—}O\text{—}R_2\text{—}O\text{—}R_3\text{—}O\text{—}R_4\text{—}O\text{—}R_5$ where the radicals $R$ and $R_5$ are hydrocarbon radicals and at least one of them contains at least six carbon atoms and the radicals $R_1$, $R_2$, $R_3$ and $R_4$ are alkylene radicals containing two to six carbon atoms. Thus, one of the radicals $R$ or $R_5$ can be hexyl and the other ethyl; one can be hexyl and the other propyl or isopropyl; one can be hexyl and the other butyl, secondary butyl, isobutyl or tertiary butyl; one can be hexyl and the other amyl or isoamyl; or both can be hexyl; or one can be phenyl and the other ethyl; or both can be phenyl. The radicals $R_1$, $R_2$, $R_3$ and $R_4$ are preferably ethylene but can be propylene, 1,2-propylene, butylene, amylene or hexylene. A preferred solvent for the purpose of the invention is the hexylethylether of diethylene glycol, the hexylpropylether of diethylene glycol, the hexylbutylether of diethylene glycol, the hexylamylether of diethylene glycol, the hexylethylether of dipropylene glycol, the diphenyl ether of tetraethylene glycol, or a homologue thereof. In general, the radicals R, $R_1$, $R_2$, $R_3$, $R_4$ and $R_5$ should be composed of hydrocarbon radicals of such configuration and general length, either straight or branched or cyclic, that the solvent is normally liquid under the conditions of reaction and preferably normally liquid at 20° C. Another glycol diether which can be employed in conjunction with tetrahydrofuran is the dibutylether of diethylene glycol.

Other water miscible solvents can be present, such as, for example, water soluble liquid dialkylethers of alkylene glycols, e.g., the dimethylether of triethylene glycol, the diethyl ether of diethylene glycol, the diethyl ether of triethylene glycol, the diethyl ether of tetraethylene glycol, and mixtures of the diethyl ethers of the di-, tri-, and tetraethylene glycols, and other water miscible homologues. In addition, as previously described, other water immiscible solvents can be employed, such as, for example, aromatic hydrocarbon solvents, e.g., benzene, xylene and toluene. Various combinations of solvents are possible. The solvents should be incapable of reacting chemically with the Grignard reagent to destroy it. In other words, the solvents should be substantially inert with respect to the Grignard reagent. However, at least one water miscible solvent should be steam distillable, e.g., tetrahydrofuran, and at least one solvent should be a normally liquid diether of a glycol which is not substantially steam distillable under conditions at which the organic lead compound and the water miscible solvent are practically completely steam distilled. The temperature and pressure conditions of steam distillation will normally be those conditions which are most economical and practical for steam distillation of the organic lead compound.

The electrolyte from which the organic lead compound is recovered should preferably consist essentially of a Grignard reagent, tetrahydrofuran and a solvent for the Grignard reagent which is not substantially steam distillable with the organic lead compound under the conditions previously indicated, and preferably should also contain an aromatic hydrocarbon compatible with antiknock mixtures and gasoline, which is steam distillable with the organic lead compound.

The invention also contemplates recovery systems in the manufacture of mixed alkyl lead compounds, such as, triethylmethyl lead, diethyldimethyl lead and ethyltrimethyl lead, usually in the form of mixtures with tetraethyl lead and tetramethyl lead by using as the electrolyte mixtures of methyl magnesium chloride and ethyl magnesium chloride. Specific examples of other Grignard reagents are ethyl magnesium bromide, isopropyl magnesium chloride, isopropyl magnesium bromide, butyl magnesium chloride, butyl magnesium bromide, amyl magnesium bromide, amyl magnesium chloride, and higher alkyl homologues. Similarly, the phenyl magnesium chloride, phenyl magnesium bromide or mixtures of phenyl and ethyl magnesium chloride, or mixtures of phenyl and ethyl magnesium bromide, or mixtures of phenyl and methyl magnesium chloride, or mixtures of phenyl and methyl magnesium bromide can be electrolyzed to produce other organic lead compounds containing the phenyl radical or both the phenyl and ethyl radicals, or both the phenyl and methyl radicals, or both the phenyl and other alkyl radicals in case a higher alkyl magnesium halide is substituted for the ethyl magnesium halide or the methyl magnesium halide.

The invention is hereby claimed as follows:

1. In an electrolytic process for making organic lead compounds in which a Grignard reagent in an organic solvent comprising tetrahydrofuran is electrolyzed, using a sacrificial lead anode, and the residual electrolyte is steam distilled, the steps which comprise washing the distillate in countercurrent flow with water in a column, separating the organic lead compound at the bottom of the column, subjecting the wash water containing tetrahydrofuran to axeotropic distillation under slight superatmospheric pressure at a temperature of 165° F. to 220° F., and subjecting the resultant azeotropic distillate to distillation at a temperature of 200° F. to 230° F. under a superatmospheric pressure of 50 to 100 pounds per square inch.

2. A process as claimed in claim 1 in which the volume of wash water used in the countercurrent washing is 2 to 5 times the volume of the distillate.

References Cited
UNITED STATES PATENTS

| | | | |
|---|---|---|---|
| 2,777,867 | 1/1957 | Giraitis et al. | 260—437 |
| 3,118,825 | 1/1964 | Linsk | 204—59 |
| 3,143,481 | 8/1964 | Croxton et al. | 203—85 |
| 3,164,537 | 1/1965 | Linsk et al. | 204—59 |
| 3,245,884 | 4/1966 | Kraut | 203—76 |
| 3,247,260 | 4/1966 | Porter et al. | 203—85 |
| 3,278,398 | 10/1966 | Finneran et al. | 203—76 |

WILBUR L. BASCOMB, JR., *Primary Examiner.*